(12) United States Patent
Mullins et al.

(10) Patent No.: US 11,558,425 B2
(45) Date of Patent: Jan. 17, 2023

(54) DYNAMIC ACCESS CONTROLS USING VERIFIABLE CLAIMS

(71) Applicant: EMC IP Holding Company LLC, Hopkinton, MA (US)

(72) Inventors: Brian C. Mullins, Burlington, MA (US); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 16/527,425

(22) Filed: Jul. 31, 2019

(65) Prior Publication Data
US 2021/0037058 A1    Feb. 4, 2021

(51) Int. Cl.
*H04L 9/40*    (2022.01)

(52) U.S. Cl.
CPC ............ *H04L 63/20* (2013.01); *H04L 63/102* (2013.01)

(58) Field of Classification Search
CPC .............................. H04L 63/20; H04L 63/102
See application file for complete search history.

(56) References Cited

U.S. PATENT DOCUMENTS 10,819,747 B1 * 10/2020 Sedky .................... H04L 63/104
10,855,674 B1 * 12/2020 Geusz ...................... H04L 63/20
2017/0331810 A1 * 11/2017 Kurian .................. H04L 9/3213
2018/0046518 A1 * 2/2018 Shear ...................... H04L 47/70
2019/0261169 A1 * 8/2019 Kamal .................. H04W 12/40
2019/0311102 A1 * 10/2019 Tussy ...................... G06F 21/32

FOREIGN PATENT DOCUMENTS

WO    WO-2009036511 A    * 3/2009    ............ H04L 9/321

OTHER PUBLICATIONS

Sovrin Provisional Trust Framework, Sovrin Board of Trustees, Mar. 22, 2017.
Sovrin: A Protocol and Token for Self-Sovereign Identity and Decentralized Trust, A White Paper from the Sovrin Foundation, Version 1.0, Jan. 2018.

* cited by examiner

*Primary Examiner* — Matthew Smithers
*Assistant Examiner* — Shu Chun Gao
(74) *Attorney, Agent, or Firm* — Ryan, Mason & Lewis, LLP (57) ABSTRACT

Policy-based techniques are provided for dynamic access control for resources. One method comprises, upon a user attempt to access a given resource, identifying a policy defined for access to the given resource, wherein the policy comprises a rule and an allowed issuer of a verifiable claim; determining if the rule and the allowed issuer are satisfied based on an evaluation of the verifiable claim; and allowing the user to access the given resource if the rule and the allowed issuer are satisfied. A given rule can specify a threshold for a data item obtained from an allowed issuer. The policy can be stored by one or more policy hubs. A plurality of policy hubs can be organized in a hierarchical structure, such that one given policy is applied to the given resource in a predictable manner.

20 Claims, 6 Drawing Sheets

DYNAMIC ACCESS CONTROLS USING VERIFIABLE CLAIMS

FIELD

The field relates generally to information processing systems, and more particularly to techniques for restricting access in such information processing systems.

BACKGROUND

Access control techniques restrict access (e.g., usage) of devices, software applications and/or other resources. In order to gain access to resources via a computer or another user device, for example, users are often required to authenticate themselves by entering authentication information. A need exists for improved techniques for implementing access controls based on one or more predefined policies, that may not involve authentication.

SUMMARY

In one embodiment, a method comprises, upon a user attempt to access a given resource, identifying at least one policy defined for access to the given resource, wherein the at least one policy comprises at least one rule and at least one allowed issuer of a verifiable claim; determining if the at least one rule and the at least one allowed issuer are satisfied based on an evaluation of the verifiable claim; and allowing the user to access the given resource if the at least one rule and the at least one allowed issuer are satisfied.

In some embodiments, the at least one rule specifies a threshold for at least one data item obtained from the at least one allowed issuer. The at least one policy can be stored by at least one policy hub. A plurality of policy hubs is optionally organized in a hierarchical structure, such that a given one of a plurality of the at least one policy is applied to the given resource in a predictable manner.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for dynamic access controls using verifiable claims.

In one or more embodiments, techniques are provided for applying dynamic access controls to resources, such as Internet of Things (IoT) edge devices (e.g., vehicles, gaming consoles and sensors) and software applications, using verifiable claims. In some embodiments, a policy hub is employed to allow access control rules, for example, associated with exemplary IoT edge devices, to be dynamically updated. Verifiable claims are employed to provide flexibility in the defined access controls and to enable policy enforcement.

Verifiable claims are cryptographically signed attestations that can be verified by substantially anyone, for example, instantaneously. Verifiable claims can be issued, for example, by governments, banks, or even a friend or family member.

Figure 1:
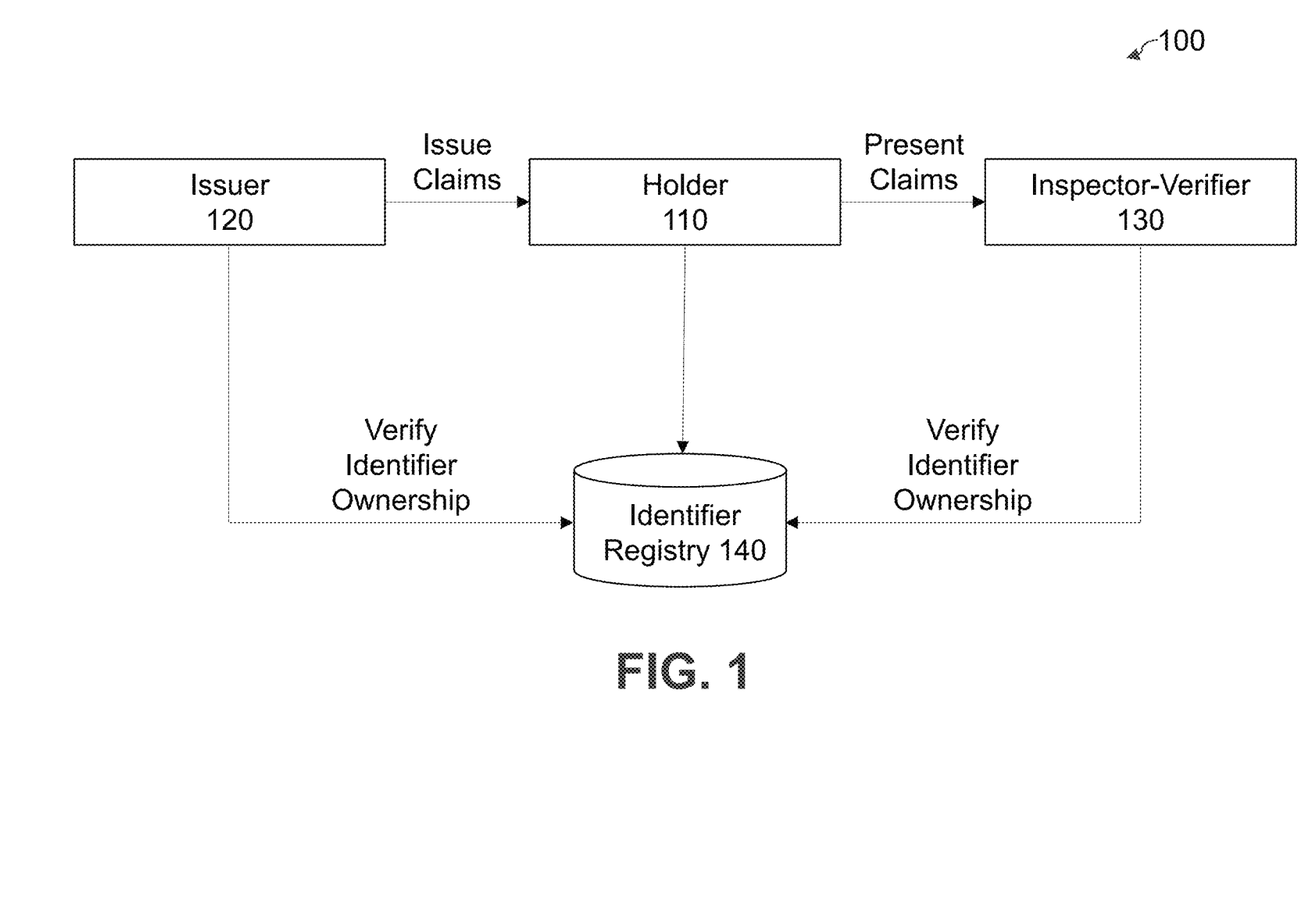
FIG. 1 illustrates an exemplary usage of verifiable claims according to a model from the World Wide Web Consortium.

FIG. 1 illustrates an exemplary usage of verifiable claims according to a model 100 from the World Wide Web Consortium (W3C). In the example of FIG. 1, a holder 110 is an entity storing one or more verifiable claims (also known as a claims wallet). In addition, an issuer 120 generates verifiable claims and sends the generated verifiable claims to the holder 110 to store. An inspector-verifier 130 requests verifiable claims from the holder 110 to verify. Finally, an identifier registry 140 stores a mapping of identifiers (IDs) with their public attributes, such as public keys.

Generally, the issuer 120 issues verifiable claims that are then stored in one or more holders 110; and each holder 110 acquires, stores and/or presents verifiable claims to the inspector-verifier 130. In addition, the issuer 120 and the inspector-verifier 130 use the identifier registry 140 to lookup identifiers and verify ownership of identifiers.

One classic example of a verifiable claim is a driver's license issued, for example, by a government entity, such as a Department of Motor Vehicles (DMV) (the issuer 120). The driver's license is stored by a person in their digital wallet application (the holder 110), which can then be presented to, for example, a liquor store or bar (the inspector-verifier 130) to prove the age of the holder. If the inspector-verifier 130 (e.g., the bar) trusts the issuer 120 of the verifiable claim (e.g., the DMV) then they can trust the issued claim (in this case, the age of the person).

One or more embodiments of the disclosure provide methods, apparatus and computer program products for applying dynamic access controls to devices using verifiable claims. In some embodiments, the disclosed techniques for applying dynamic access controls to devices using verifiable claims selectively enable devices based on predefined policy rules that require external data to be verified. Consider the following exemplary use cases:

- a child cannot drive the family car unless the current grade point average of the child exceeds 3.0;
- a pilot cannot fly a plane unless the pilot has slept more than 6 hours;
- a sales representative can utilize a company private jet if quarterly sales of the sales representative exceed $1,000,000; and
- a gaming console cannot be played by a user until a physics grade of the user exceeds a B grade.

In further variations, the policies can be more granular and can restrict access to hardware components or services available on the device. For example, if the device is a gaming console, a policy can specify that a virtual reality headset and/or premium game options can only be accessed by users that demonstrate a current grade point average (GPA) that exceeds 3.0.

In some embodiments, the disclosed policy-based access control techniques allow virtually any device to enforce a policy for accessing a given resource by evaluating any data recited in the policy, which is a powerful concept.

Figure 2:
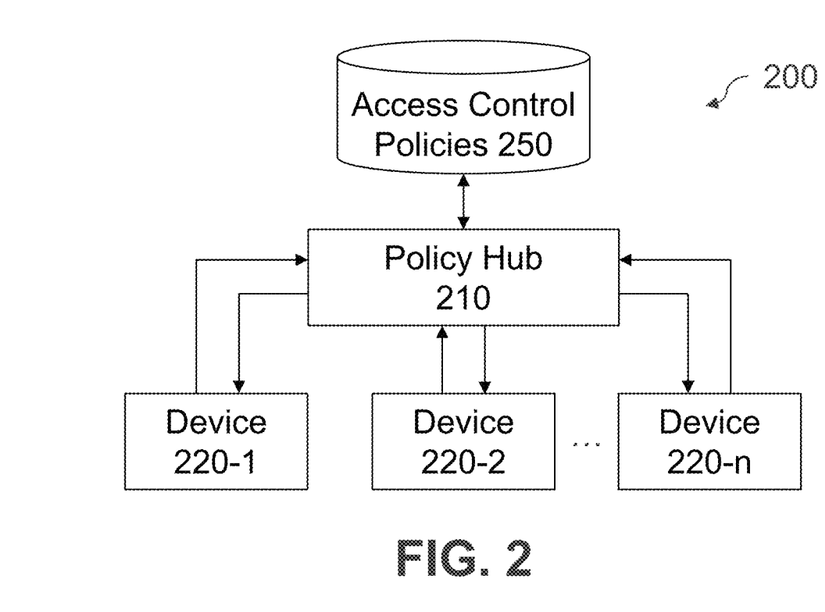
FIG. 2 illustrates an exemplary access control environment, according to some embodiments.

FIG. 2 illustrates an exemplary access control environment 200, according to some embodiments. As shown in FIG. 2, the exemplary access control environment 200 comprises a policy hub 210 and one or more devices 220-1 through 220-n, such as edge devices and other devices.

In at least one embodiment, the policy hub 210 is a centralized repository for creating new policies, updating existing policies and otherwise managing access control policies in an access control policies database 250 for one or more of the devices 220 and/or one or more hardware components or services associated with a given device 220. The policy hub 210 can manage resources other than edge devices, such as servers. Such policies could be driven by externally sourced data (e.g., a server restricts access to an application based upon the credit score of the user), in a similar manner as the edge device examples. In addition, the exemplary policy hub 210 registers devices 220 and other resources associated with devices 220 and assigns policies to devices 220.

In various embodiments, a policy hub 210 could be created for a single enterprise, a consortium of companies, or even a household. Policy hubs 210 can be hosted, for example, in the cloud or on the premises of a customer and/or user.

Policies can be defined, for example, as a set of rules and an associated set of trusted issuers 120. Consider the above-mentioned exemplary policy that a "given child cannot drive the family car unless the current grade point average of the child exceeds 3.0." For this example, a suitable rule would be defined as "GPA>3.0" and the allowed issuer 120 would be an identified school of the given child.

Similarly, for the above-mentioned exemplary policy that "a pilot cannot fly a plane unless the pilot has slept more than 6 hours," a suitable rule would be defined as "hours_slept>6" and the allowed issuer 120 would be a sleep-tracker manufacturer hired by the airliner to monitor the sleep of the pilot.

Figure 3:
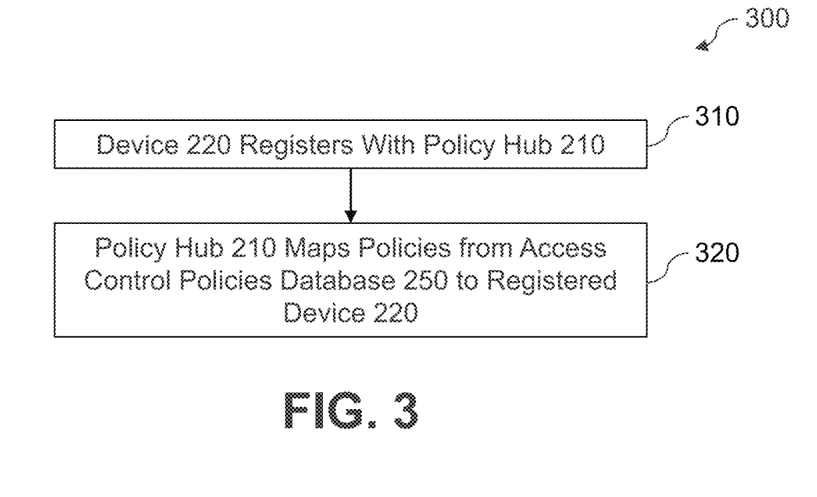
FIG. 3 is a flow chart illustrating an exemplary implementation of a device registration process, according to one embodiment of the disclosure.

FIG. 3 is a flow chart illustrating an exemplary implementation of a device registration process 300, according to one embodiment of the disclosure. As shown in FIG. 3, a device 220, such as an IoT edge device, registers with the policy hub 210 during step 310. Depending on the nature of the device 220 (and/or the resources associated with the device 220), the registration during step 310 occurs, for example, by the device 220 reaching out to the policy hub 210, or the policy hub 210 pushing one or more policies down to the device 220. The policy hub 210 may receive one or more policies for the device 220 as part of the registration during step 310 that are then stored in the access control policies database 250.

During step 320, the policy hub 210 maps one or more policies from the access control policies database 250 to the registered device 220.

Figure 4:
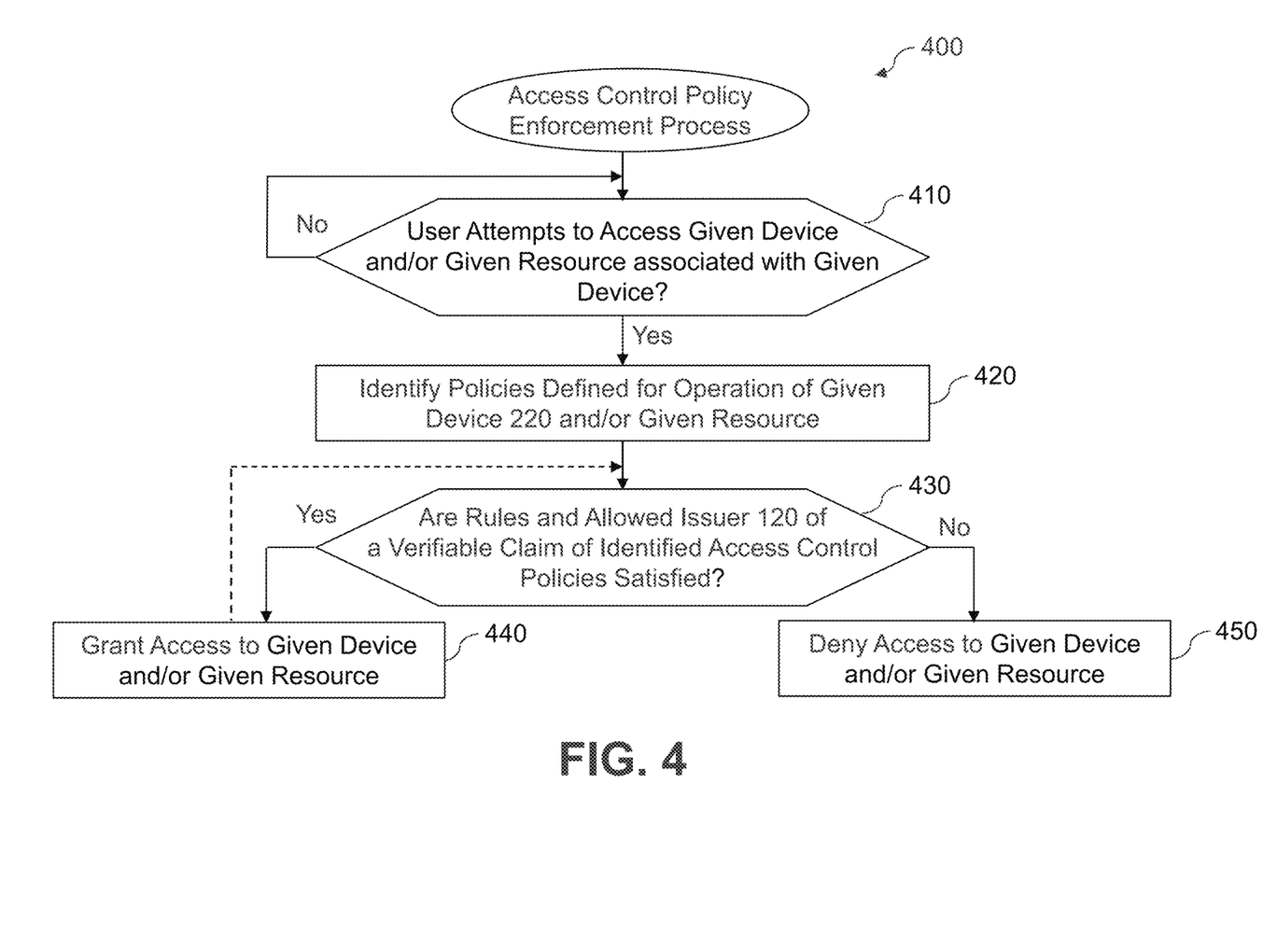
FIG. 4 is a flow chart illustrating an exemplary implementation of an access control policy enforcement process, according to at least one embodiment.

FIG. 4 is a flow chart illustrating an exemplary implementation of an access control policy enforcement process 400, according to at least one embodiment. As shown in FIG. 4, when step 410 determines that a user attempts to access a given device 220 (and/or a given resource associated with the device 220), the one or more policies defined for operation of the given device 220 and/or given resource are identified during step 420. It is noted that the term "user," as used herein, shall be broadly construed to cover a human user attempting to access a protected resource as well as devices and/or software applications attempting to access a protected resource.

The rules and allowed issuer 120 of a verifiable claim of any identified access control policies are evaluated during step 430 before the user can use the given device 220 (and/or the given resource associated with the device 220). The determining considers whether the rules and allowed issuer are satisfied based on an evaluation of the verifiable claim. As used herein, the term "based on" shall encompass an evaluation based at least in part on the verifiable claim.

If it is determined during step 430 that rules and allowed issuer 120 of any identified access control policies are satisfied, the user is allowed to access the given device 220 and/or the given resource during step 440. The test performed during step 430 may be performed, for example, only upon initial access, or the test may be performed multiple times during the course of operation (for example, using time-based or event-based techniques). In addition, the test performed during step 430 may be performed, for example, by the given device 220 itself or by another entity, such as, for example, a hosted claims verification service or the policy hub 210 (e.g., implementing a hosted claims verification service).

If it is determined during step 430 that any rules and/or allowed issuer 120 of any identified access control policies are not satisfied, the user is denied access to the given device 220 and/or the given resource during step 450.

Consider the following sequence for the use case of a teenager not being able to drive a vehicle unless the teenager has a valid driver's license issued from a trusted DMV and a GPA that exceeds 3.0. In this example, consider that a policy hub 210 has been set up by parents of the teenager and is hosted in the cloud.

1. The vehicle owner (parent) logs into the policy hub 210 and registers their vehicle identification number with the policy hub 210;

2. The parents specify the policy that they wish to be applied to a/any vehicle, namely, that the vehicle cannot be driven by a minor unless he or she has a valid driver's license and a GPA that exceeds 3.0;

3. The parent may optionally specify a set of issuers that the parent trusts for creating claims regarding ownership of a driver's license (DMV of the state) and GPA (school). Alternatively, these trust relationships can be managed by the policy hub 210 and presented to the parent as options. For example, the policy hub 210 can have trusted relationships with a number of issuers and only claims from those issuers can be included in policies specified in the policy hub 210 (e.g., in a similar manner as how IFTTT (If This Then That) provides available triggers and actions);

4. The policy hub 210 then pushes down the policy to the vehicle requiring that:
   a. the user has a valid driver's license;
   b. has a GPA that exceeds 3.0;

5. the student then enters the vehicle and optionally authenticates himself or herself;
   a. authentication of the user could happen in any number of ways, such as a unique car key or username/password (generally, the vehicle typically needs to know which person is attempting to drive; as an alternative to a unique key or password, the presented claim(s) could be signed (e.g., using a JWT (JSON Web Token)).

6. before the vehicle can be started, the vehicle (in this example) challenges the user to prove their licensure and GPA;

7. the user has already stored a verified claim regarding their licensure from the DMV on their phone, for example, (a claim from the user's school with the grades of the student from the last quarter has also been issued and stored on the user's phone or is obtained using remote communications with the issuer, for example);

8. the user scans a QR (Quick Response) code, for example, on the vehicle dashboard requesting that a verifiable claim is shared for each requirement (the user consents and shares the claims);

9. since the vehicle optionally has an Internet connection and is capable of verifying cryptographic signatures, the vehicle verifies the claims and ensures that the claims emanate from trusted issuers; and 10. upon successful verification, the vehicle starts and/or is otherwise enabled.

Smart Wallet

One challenge in the exemplary design is an assumption that the user possesses an up-to-date verifiable claim, e.g., proof that the airline pilot slept at least six hours last night. The traditional approach requires that the pilot manually request a new claim from the issuer and import the claim into his or her claims wallet application. In one variation, a smart wallet could be developed that learns the behavior of the user based upon, for example, the day-of-week, time-of-day and/or location, and prefetches claims on behalf of the user. For example, consider that when the airline pilot arrives at an airport their smart wallet requests a verifiable claim from their Bluetooth wearable device. Upon sitting in the cockpit, the pilot can present the claim to the plane.

Alternatively, a claims wallet could be created that leverages a publication-subscription model. For example, consider the student that requires a certain GPA in order to drive the family car. Rather than manually retrieving claims from the school every day, the wallet application of the student could subscribe to a claims feed from the school. In this manner, any changes to the GPA of the student will automatically push a new claim down to his or her wallet.

Variations

In some embodiments, it is also possible for the process of collecting claims to be delegated. Consider the example of a gaming console that has a similar minimum GPA restriction. Because the user logs into the console, the user could delegate to the console the collection and verification of the necessary claims. The console could query the school issuer (or subscribe to a feed from the school on behalf of the user) to confirm the GPA and enforce policies without asking the user to actively share claims each time.

In a further variation, policies can be applied to devices (and/or other resources) from more than one policy hub 210. Policy hubs 210 could be organized, for example, in a hierarchical structure thereby allowing policies to override each other in a predictable manner, resulting in a single policy being applied to a given device or resource.

One or more embodiments of the disclosure apply access control policies to devices and/or other resources using verifiable claims and a centralized policy hub (or multiple policy hubs). In some embodiments, a smart wallet prefetches verifiable claims on behalf of the user or subscribes to a claims feed.

In some embodiments, the disclosed policy-based techniques for dynamic access control for resources provide an improved ability to restrict access to devices and other resources.

Among other benefits, the disclosed dynamic access control techniques using verifiable claims evaluate one or more rules and verify an issuer of the verifiable claim, before granting access to a given resource. One or more embodiments of the disclosure provide improved methods, apparatus and computer program products for dynamic access controls using verifiable claims. The foregoing applications and associated embodiments should be considered as illustrative only, and numerous other embodiments can be configured using the techniques disclosed herein, in a wide variety of different applications.

It should also be understood that the disclosed policy-based techniques for dynamic access control for resources, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for dynamic access controls using verifiable claims may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based dynamic access control engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based dynamic access control platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
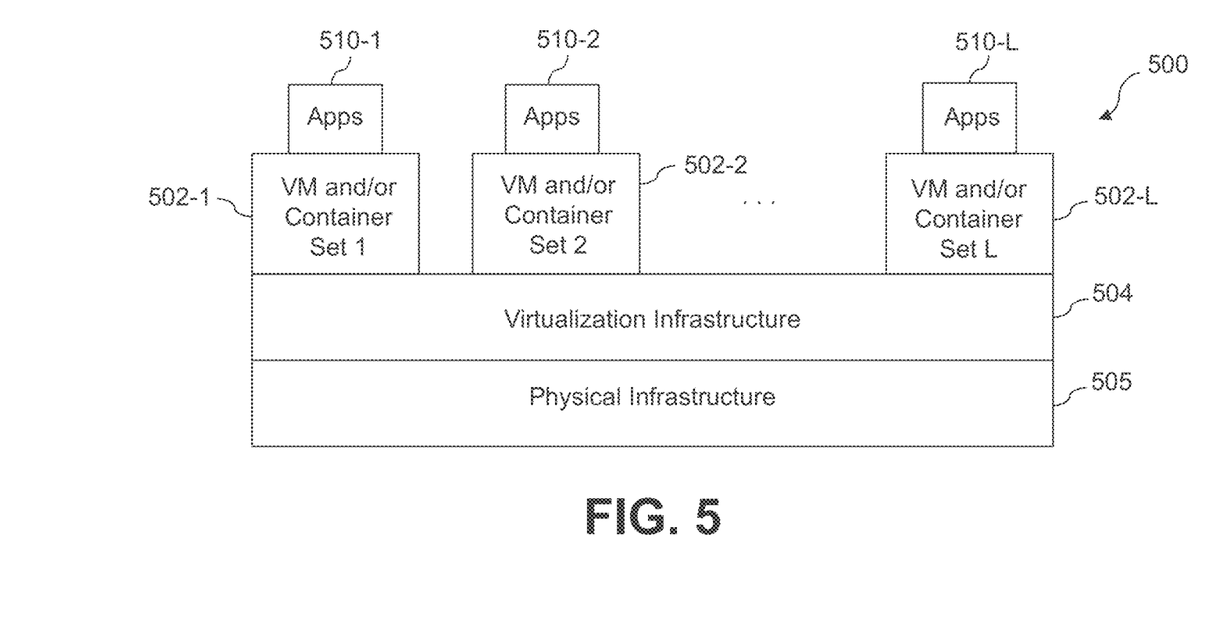
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, . . . 502L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide policy-based dynamic access control functionality of the type described above for one or more processes running on a given one of the VMs. For example, each of the VMs can implement dynamic access control logic and associated policy evaluation for providing dynamic access control functionality using verifiable claims for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide policy-based dynamic access control functionality of the type described above for one or more processes running on different ones of the containers. For example, a container host device supporting multiple containers of one or more container sets can implement one or more instances of dynamic access control logic and associated policy evaluation for providing dynamic access control functionality using verifiable claims.

As is apparent from the above, one or more of the processing modules or other components of the exemplary access control environment 200 of FIG. 2 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
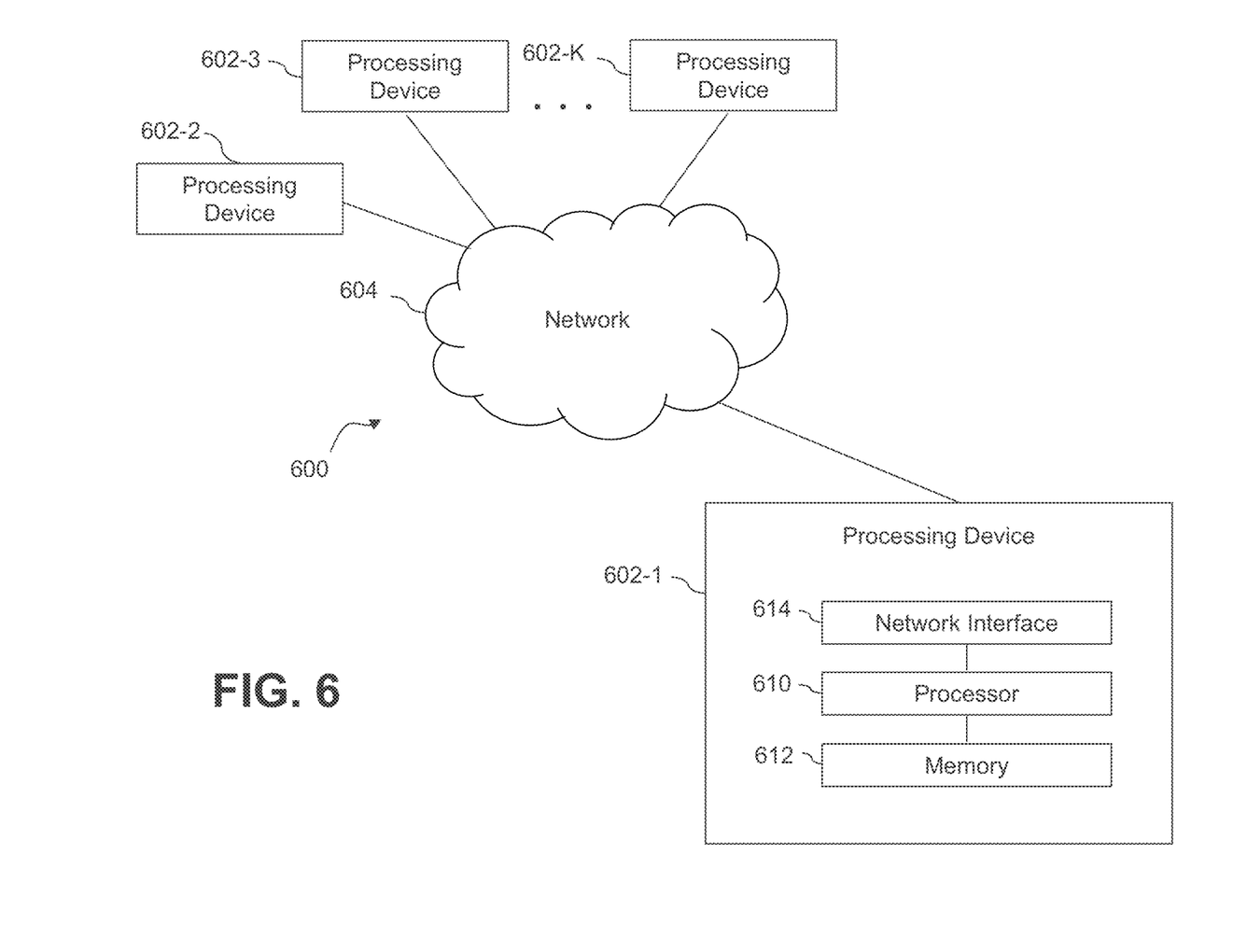
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
in response to a user attempt to access a given resource:
identifying at least one policy defined for access to the given resource, wherein the at least one policy comprises at least one rule and at least one allowed issuer of a verifiable claim, wherein the verifiable claim is issued, prior to the user attempt to access the given resource, by the at least one allowed issuer and comprises a cryptographically signed attestation with respect to at least one characteristic of the user, wherein at least a given one of the at least one characteristic of the user changes over time and wherein the verifiable claim is automatically updated based at least in part on a learned behavior of the user to update the attestation with respect to the given characteristic of the user;
determining, by a verifier entity, if the at least one rule and the at least one allowed issuer are satisfied based on an evaluation of the verifiable claim, wherein the verifier entity is distinct from the at least one allowed issuer; and
automatically allowing the user to access the given resource in response to the at least one rule and the at least one allowed issuer being satisfied;
wherein the method is performed by at least one processing device comprising a processor coupled to a memory.

2. The method of claim 1, further comprising preventing the user from accessing the given resource if one or more of the at least one rule and the at least one allowed issuer are not satisfied.

3. The method of claim 1, wherein one or more of the at least one rule and the at least one allowed issuer are obtained by scanning a Quick Response code associated with the given resource.

4. The method of claim 1, wherein the at least one rule specifies a threshold for at least one data item obtained from the at least one allowed issuer.

5. The method of claim 4, wherein the at least one data item is obtained from the at least one allowed issuer using one or more of a (i) smart wallet that prefetches the at least one data item using learned behavior of the user; and (ii) a publication-subscription model.

6. The method of claim 1, wherein the given resource comprises one or more of a device, a software application and an account.

7. The method of claim 1, wherein the at least one policy is stored by at least one policy hub.

8. The method of claim 7, wherein a plurality of the at least one policy hub is organized in a hierarchical structure, such that a given one of a plurality of the at least one policy is applied to the given resource in a predictable manner.

9. The method of claim 1, wherein the verifier entity comprises one or more of at least one device associated with the given resource and a hosted claims verification service.

10. The method of claim 1, wherein the at least one policy is defined by presenting a plurality of approved issuers for selection as part of the at least one policy.

11. The method of claim 1, wherein a collection of the verifiable claim is delegated to at least one user device.

12. A computer program product, comprising a non-transitory machine-readable storage medium having encoded therein executable code of one or more software programs, wherein the one or more software programs when executed by at least one processing device perform the following steps:
in response to a user attempt to access a given resource:
identifying at least one policy defined for access to the given resource, wherein the at least one policy comprises at least one rule and at least one allowed issuer of a verifiable claim, wherein the verifiable claim is issued, prior to the user attempt to access the given resource, by the at least one allowed issuer and comprises a cryptographically signed attestation with respect to at least one characteristic of the user, wherein at least a given one of the at least one characteristic of the user changes over time and wherein the verifiable claim is automatically updated based at least in part on a learned behavior of the user to update the attestation with respect to the given characteristic of the user;
determining, by a verifier entity, if the at least one rule and the at least one allowed issuer are satisfied based on an evaluation of the verifiable claim, wherein the verifier entity is distinct from the at least one allowed issuer; and automatically allowing the user to access the given resource in response to the at least one rule and the at least one allowed issuer being satisfied.

13. The computer program product of claim 12, wherein the at least one rule specifies a threshold for at least one data item obtained from the at least one allowed issuer.

14. The computer program product of claim 12, wherein the at least one policy is stored by at least one policy hub, wherein a plurality of the at least one policy hub is organized in a hierarchical structure, such that a given one of a plurality of the at least one policy is applied to the given resource in a predictable manner.

15. The computer program product of claim 12, wherein the at least one policy is defined by presenting a plurality of approved issuers for selection as part of the at least one policy.

16. An apparatus, comprising:
a memory; and
at least one processing device, coupled to the memory, operative to implement the following steps:
in response to a user attempt to access a given resource:
identifying at least one policy defined for access to the given resource, wherein the at least one policy comprises at least one rule and at least one allowed issuer of a verifiable claim, wherein the verifiable claim is issued, prior to the user attempt to access the given resource, by the at least one allowed issuer and comprises a cryptographically signed attestation with respect to at least one characteristic of the user, wherein at least a given one of the at least one characteristic of the user changes over time and wherein the verifiable claim is automatically updated based at least in part on a learned behavior of the user to update the attestation with respect to the given characteristic of the user;

determining, by a verifier entity, if the at least one rule and the at least one allowed issuer are satisfied based on an evaluation of the verifiable claim, wherein the verifier entity is distinct from the at least one allowed issuer; and automatically allowing the user to access the given resource in response to the at least one rule and the at least one allowed issuer being satisfied.

17. The apparatus of claim 16, wherein the at least one rule specifies a threshold for at least one data item obtained from the at least one allowed issuer.

18. The apparatus of claim 16, wherein the at least one policy is stored by at least one policy hub, wherein a plurality of the at least one policy hub is organized in a hierarchical structure, such that a given one of a plurality of the at least one policy is applied to the given resource in a predictable manner.

19. The apparatus of claim 16, wherein the at least one policy is defined by presenting a plurality of approved issuers for selection as part of the at least one policy.

20. The apparatus of claim 16, wherein a collection of the verifiable claim is delegated to at least one user device.

\* \* \* \* \*